July 1, 1930.     J. C. BERGNER     1,768,737
COOKING APPARATUS
Filed June 16, 1928     3 Sheets-Sheet 2
FIG. II
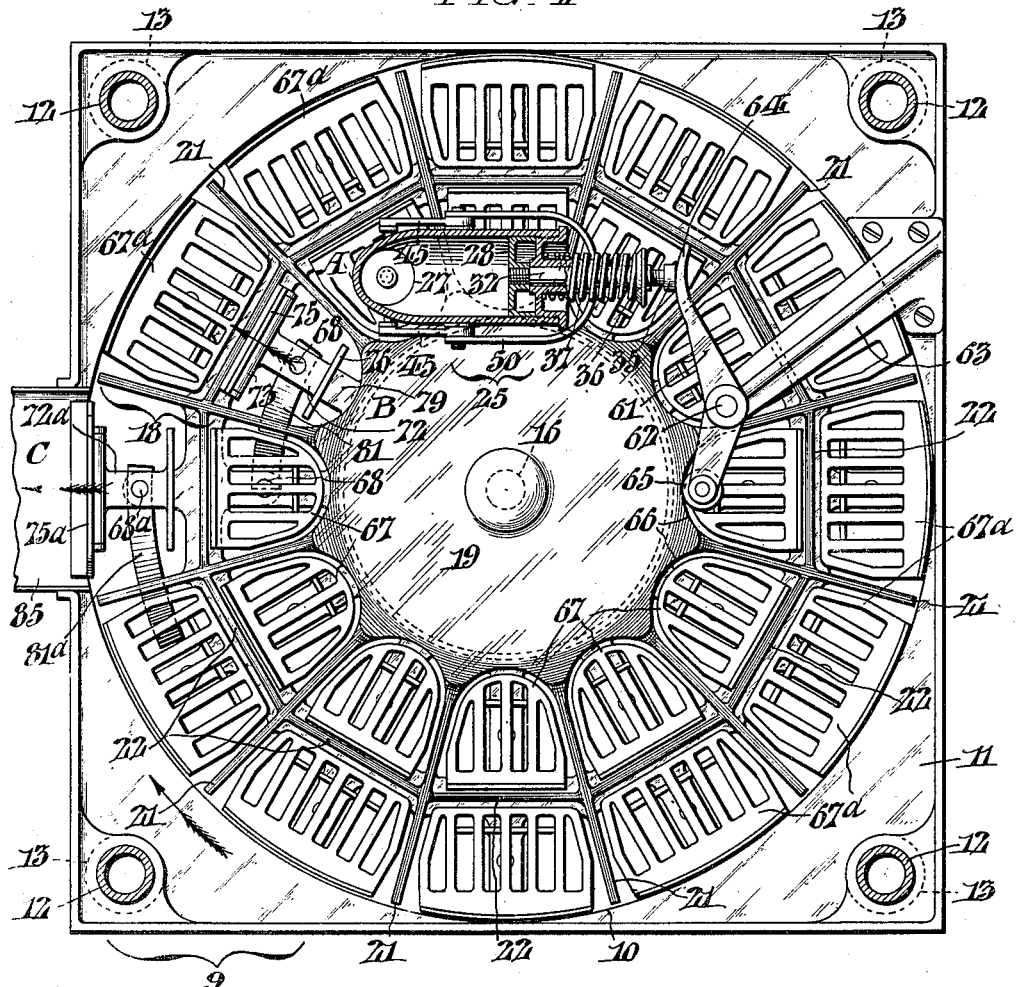
FIG. IV
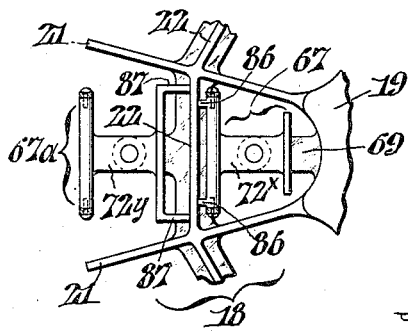
WITNESSES:
Thomas W. Kerr, Jr.
John A. Weidler
INVENTOR:
John C. Bergner
BY Foley & Paul
ATTORNEYS.

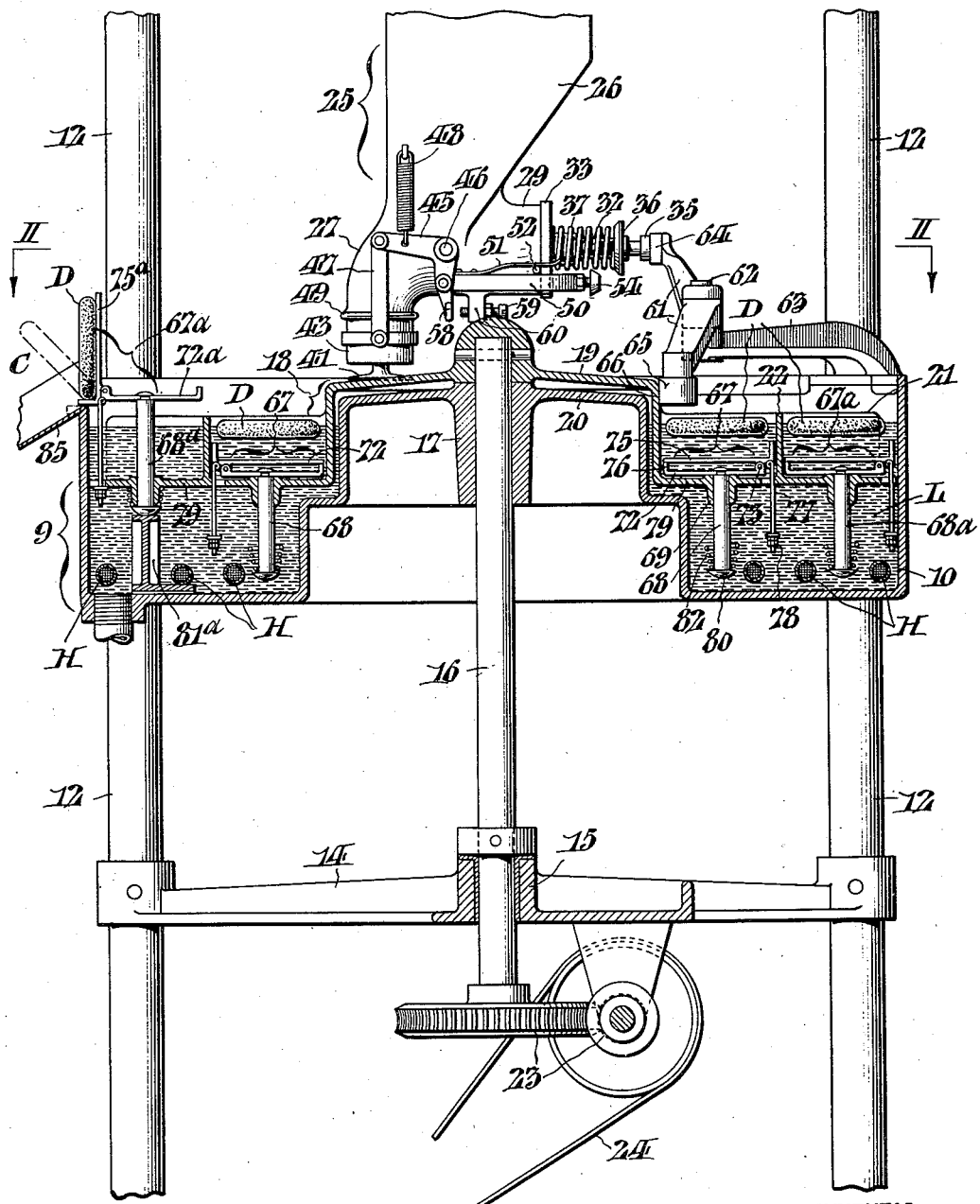

July 1, 1930. J. C. BERGNER 1,768,737
COOKING APPARATUS
Filed June 16, 1928 3 Sheets-Sheet 3
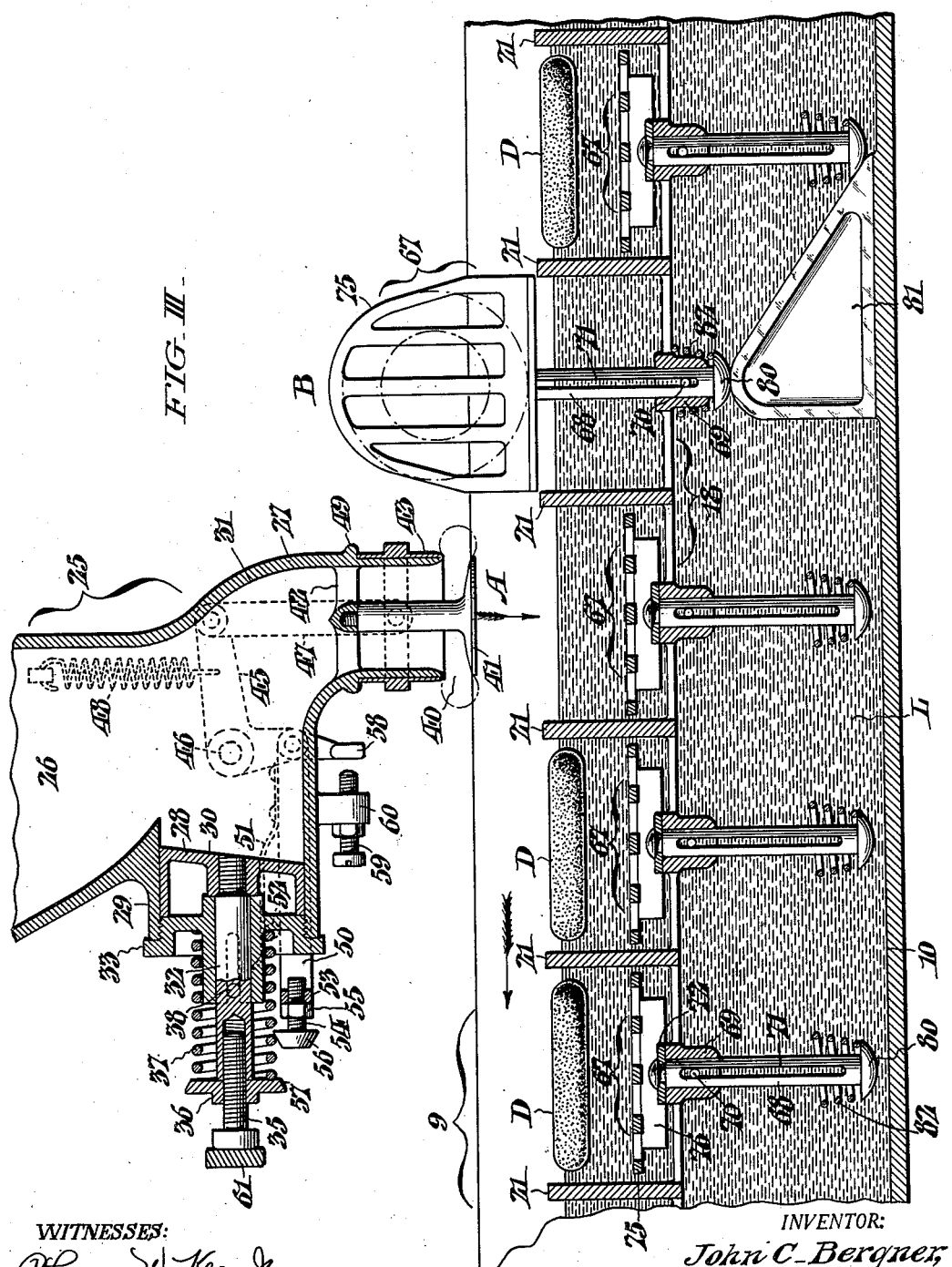
WITNESSES:
INVENTOR:
John C. Bergner,
BY
ATTORNEYS.

Patented July 1, 1930

1,768,737

UNITED STATES PATENT OFFICE

JOHN C. BERGNER, OF LANSDOWNE, PENNSYLVANIA, ASSIGNOR TO DOUGHNUT MACHINE CORPORATION, OF NEW YORK, N. Y., A CORPORATION OF NEW YORK

COOKING APPARATUS

Application filed June 16, 1928. Serial No. 285,869.

This invention relates to apparatus for cooking articles such as doughnuts in hot liquor, and more particularly to cooking apparatus of the type shown and described in U. S. Letters Patent Nos. 1,492,541 and 1,492,542 both granted me under date of April 29, 1924. In the patented machines a forming device successively produces and releases raw annular formations of dough to drop into a receptacle containing hot cooking liquor wherein an intermittently operating cellular means progresses the articles about while maintaining them in definite separation in the liquor. During each rest period of the progressing means, automatic manipulating means function to turn over an article incidentally to transferring it from one cell to another after having been in the liquor for a predetermined period, and at the same time to eject another cooked article from the apparatus.

Amongst the objects of the present invention are to enable forming, turning and ejecting of the articles without requiring periodic stoppage of the progressing means for the purpose, and to secure this desideratum through motion derived directly from said progressing means. A very simple continuously operating means can accordingly be substituted for driving the progressing means in lieu of the complicated intermittent actuating mechanisms heretofore employed. Moreover since all the manipulations essential to automatic production and cooking of doughnuts (i. e. forming, turning and ejecting) are all governed in the present instance by the progressing means, the necessity for maintenance of separate actuating mechanisms in accurate timed relation as required in the past is entirely precluded.

Still further objects and attendant advantages will be manifest from the detailed description which follows of the typical embodiment of this invention shown in the drawings, whereof—

Fig. I is a fragmentary vertical sectional view of my improved cooking apparatus.

Fig. II shows a plan sectional view taken as indicated by the arrows II—II in Fig. I.

Fig. III is a diagrammatic view in linear development showing the successive steps of forming and turning the articles; and, Fig. IV is a fragmentary view showing a modified detail of my invention.

The cooking apparatus herein delineated comprises a receptacle structure 9 for the cooking liquor, the same providing an annular channel 10 with a flanking splash apron 11 of rectangular outline. The cooking liquor is heated preferably by submerged electric coils such as conventionally represented at H in Fig. I. The receptacle structure 9 is supported at a suitable elevation from the floor by four columns or posts 12 which pass through bosses 13 at the corners of its apron 11. A cross frame 14, connecting the columns or posts 12 at a level below the receptacle structure 9, affords a lower bearing 15 for a vertical shaft 16. This shaft extends up through a central bearing 17 of the receptacle structure 10, and has secured to its upper protruding end the element 18 by which the doughnuts are progressed in the cooking liquor L about the channel 10. As shown, the central portion 19 of the progressing element 18, (which for convenience I will hereinafter term "the spider"), is made hollow to overhang the axial embossment 20 of the receptacle structure 9, and from it extend a series of radial vanes 21 that reach into close proximity to the outer wall of the channel 10 and are continuously joined medially by transverse webs 22. The spider 18 thus provides a number of parallel or concentric annular series of cells (whereof there are two shown in the present instance) in which the individual doughnuts D are maintained definitely separated in the cooking liquor L. The shaft 16 of the progressing spider is continuously rotated at a constant slow rate of speed in the direction of the arrow in Fig. II by worm gearing 23 (Fig. I) which may be driven, through the medium of a belt 24, by any suitable prime mover, such for example as an electric motor, not shown.

At a station A, a forming device 25 supported in suspension in any suitable manner from an upper cross frame (not shown) of the machine, produces the raw doughnuts one by one, and releases them to drop into the inner circle of spider cells as said cells are successively presented at said station. In the forming device 25, the dough gravitates from a hopper 26, and is assisted toward an axially-offset outlet 27 by a piston 28 operating in a horizontal cylindric cavity 29 in the side of the hopper at the bottom.

The forward face of the piston 28 is inclined somewhat to the vertical as at 30 for capacity to cooperate with the opposing counter slope of the hopper wall at 31 in insuring displacement of a unit quantity of the dough downward through the outlet 27 at each actuation. The rod or stem 32 of the piston 28 has bearing in a removable screw cap 33 closing the open end of the cavity 29, and is internally tapped at its outer end to take a screw extension 35 adapted to be fixed in adjusted positions by a nut collar 36. A helical spring 37 in compression between the nut collar 36 and the cover cap 33 acts to yieldingly oppose inward movement of the piston 28, and the latter is held against rotating by a pin 38 which is confined to slide in a longitudinal slot in the bearing boss of said cover cap 33. The unit portions of dough displaced by the piston 28, are expelled through an annular die opening 40 afforded between the lower edge of the hopper outlet 27 and a disk 41 suspended axially from a bridging bar 42 within said outlet. A cutter sleeve 43 slidable downward on the outlet and over the edge of the disk 41 serves to sever the extrusions of dough which are accordingly released as annular formations to drop horizontally into the cooking liquor in the receptacle. Such movement is imparted to the cutter sleeve 43 by mechanism including a pair of bell crank levers 45 which are fulcrumed on studs 46 projecting from opposite sides of the hopper, and have their horizontal arms coupled, by means of links 47, with said sleeve. Tension springs 48 effective upon the bell crank levers 45 normally hold the cutter sleeve 43 raised against a stop bead 49 about the hopper outlet 27, with the die opening 40 unobstructed. To the depending extremities of the bell crank levers 45 is pivoted a yoke piece 50 which extends around the back of the piston cavity 29 of the hopper 26 and is normally held in the horizontal position shown, with capacity for yielding to depression, by a pair of leaf springs 51 over-reaching lugs 52 projecting laterally from the hopper casing. Centrally of its cross bar 53, the yoke piece 50 carries a screw stud 54 which is fixable in adjusted positions by an associated jamb nut 55. The head of the stud 54 is beveled as at 56 for cam action with a corresponding peripheral bevel 57 of the nut collar 36 on the piston rod 32. The yoke piece 50 also has depending from it at the region of the pivotal connection with one of the bell crank levers 45, a downward extremity 58 designed to cooperate with an adjustable stop screw 59 in a lug 60 of the hopper casing. As the plunger 28 moves forward through its active stroke, the yoke piece 50 is depressed against the lift of the leaf springs 51 incidentally to passage of the nut collar 36 on the plunger rod 32 over the bevelled head 56 of the stud 54, but such actuation of said yoke piece is unproductive of any action upon the cutter sleeve 43. However, with return of the piston 28, an effective interlock takes place between the nut collar 36 and the stud 54, with the result that the yoke piece 50 is drawn rearward and the cutter sleeve 43 moved downward to sever the extrusion at the die opening 40. Just before the piston 28 reaches the limit of its rearward movement, the depending extremity 58 of the yoke piece 50 encounters the stop screw 59. The connection between the nut collar 36 and the stud 54 is thus suddenly broken and the cutter sleeve 43 instantly raised to the elevated position illustrated under pull of the tension springs 48 on the bell crank levers 45. The plunger of the forming device 25 is actuated directly by the progressing spider 18 through a rocker arm 61 mounted to swing in a horizontal plane about a pivot 62 upstanding from the end of a supporting bracket arm 63 that reaches inward over the channel 10 from one side of the structure 9. One extremity of the rocker arm 61 is rounded at 64 to cooperate with the head of the extension 35 of the piston rod 32, while its other extremity carries a roller 65 to ride a scolloped cam edge 66 around the central portion 19 of the progressing spider 18, the scollops coinciding with the curved walls of the cells of the inner series. Thus with the passage of each inner spider cell by the lever 61, the piston 28 of the forming device is actuated once with expulsion and release of a formation to drop into another cell of the same series further on at the station A. Obviously the size of the formations is determined by the inward throw accorded the plunger 28 which may be regulated through adjustment of the plunger rod screw extension toward and away from the end 64 of the actuating arm 61.

To turn over the doughnuts and at the same time transfer them from the inner spider cells to the corresponding cells of the outer series, I place in each of said inner cells a normally-submerged manipulating device 67. These several manipulating devices are identical in construction, each comprising a lifting stem 68 which is slidable in a bearing 69 provided by the spider and held from rotating by a pin 70 engaging a longitudinal slot 71. Affixed to the top of the stem 68 is a supporting piece 72 which provides fulcrum attachment at 73 for a turn-over hand 75, as well as a rest ledge 76 for the free end of the hand, see Fig. I. Pivotally hung from the hand 75 immediately outward of the fulcrum 73 is a depending rod 77 carrying a stop 78, which, as the device 67 nears the upper limit of its movement, engages the bottom of the bearing supporting web 79 of the spider 18 and causes the hand to be swung to substantially upright position. As a consequence, the doughnut is taken from the inner cell of the spider, transferred over the top of the separating barrier web 22 and deposited invertedly into the corresponding outer cell in a manner simulative of that shown and described in my Patent #1,492,541 aforementioned. Such actuation of the manipulating devices 67 occurs (as shown by the arrow at a station B in Fig. II) directly adjacent the depositing station A after the doughnuts have made a complete round of the channel 10 and are well cooked on the one side, and is brought about through riding of the lower round headed ends 80 of the lifting stems 68 up an incline stationary cam 81 secured to the bottom of the receptacle structure 9 at said station B. To insure the turn-over devices 67 against sticking in the raised position, I associate a coiled spring 82 with each of their stems 68, said spring being compressed during the lifting movement for capacity to re-act immediately with passage of the stem beyond the cam 81.

Ejection of the completely cooked doughnuts from the machine is accomplished at a station C directly adjacent the turning station B and after a final round in the channel 10 of the receptacle structure 9, by manipulating devices 67ª, which, except as to dimensions, are exactly like the turn-over devices 67. The manipulating devices 67ª are actuated incidentally to passage of their lifting stems 68ª over a stationary inclined cam 81ª lying beneath the path of the outer spider cells and secured to the bottom of said receptacle as is the case with the cam 81. An inclined discharge chute 85 is provided at the station C for guiding the doughnuts, ejected as designated by the arrow in Fig. II, to a suitable collecting receptacle, not shown.

From the foregoing it will be seen that the apparatus of my present invention is operative, generally speaking, upon the same principle disclosed in my previous patents, i. e., a half cooked doughnut is turned over at the station B and a fully cooked doughnut ejected at the station C for each raw doughnut deposited at the station A. In this case however, all the necessary manipulations are directly controlled by the progressing means 18 whose operation is distinguished from the corresponding element of my previous machines by the fact that it is continuous. The machine may be enclosed in a jacket or casing, and otherwise provided with auxiliary equipment as in the patents supra.

In Fig. IV I have shown a slightly modified detail in connection with the manipulating devices 67 and 67ª. In the modification, the supporting members 72ˣ and 72ʸ are respectively provided with lugs 86, 87 to engage the barrier partitions 22 separating the inner and outer cells of the spider 18. By this arrangement, the lugs 86, 87 prevent turning of the devices 67, 67ª in their respective cells about the stem 68, 68ª during elevation by the stationary cams 81, 81ª. The modified construction may be employed in lieu of the pin and slot connections 70, 71 of the previous embodiment when the depth of the radial vanes 21 of the spider is increased.

Having thus described my invention, I claim:

1. In apparatus for cooking articles such as doughnuts with hot cooking liquor, a receptacle for the liquor, means for progressing the articles in the liquor, and means carried by the progressing means to turn over the articles during cooking.

2. In apparatus for cooking articles such as doughnuts with hot cooking liquor, a receptacle for the liquor, means for progressing the articles in the liquor, and means carried by the progressing means to turn over the articles during cooking and to eject them from the apparatus at the expiration of the cooking period.

3. In apparatus for cooking articles such as doughnuts in hot cooking liquor, a receptacle for the liquor, continuously moving means for progressing the articles in the liquor, and intermittently operating means carried by the progressing means for turning over the articles during cooking.

4. In apparatus for cooking articles such as doughnuts in hot cooking liquor, a receptacle for the liquor, continuously moving means for progressing the articles in the liquor, and intermittently operating means carried by the progressing means for turning over the articles during cooking and for ejecting them from the apparatus at the expiration of the cooking period.

5. In apparatus for cooking articles such as doughnuts with hot cooking liquor, a receptacle for the liquor, means for progressing articles in the liquor, and means carried by, and actuated through movement of the progressing means to turn over the articles during cooking.

6. In apparatus for cooking articles such as doughnuts with hot cooking liquor, a receptacle for the liquor, means for progressing articles in the liquor, and means carried by, and actuated through movement of the progressing means for turning the articles during cooking and for ejecting them from the apparatus at the expiration of the cooking period.

7. In apparatus for cooking articles such as doughnuts with hot cooking liquor, a receptacle for the liquor, means for progressing the articles in the liquor, and means deriving movement from the progressing means for forming the raw articles and releasing them to drop into the liquor, for turning the articles during cooking, and for ejecting them at the expiration of the cooking period.

8. In apparatus for cooking articles such as doughnuts with hot cooking liquor, a circular receptacle for the liquor, rotating means for progressing the articles in the liquor, and means carried by the progressing means for turning over the articles during cooking.

9. In apparatus for cooking articles such as doughnuts with hot cooking liquor, a circular receptacle for the liquor, rotating means for progressing the articles in the liquor, and means carried by the progressing means for turning over the articles during cooking and for ejecting them from the apparatus at the expiration of the cooking period.

10. In apparatus for cooking articles such as doughnuts with hot cooking liquor, a circular receptacle for the liquor, rotating means for progressing the articles in the liquor, and means carried by, and actuated through movement of the rotating progressing means to turn over the articles during cooking.

11. In apparatus for cooking articles such as doughnuts with hot cooking liquor, a circular receptacle for the liquor, rotating means for progressing the articles in the liquor and means carried by, and actuated through movement of the rotating progressing means for turning over the articles during cooking and for ejecting them from the apparatus at the expiration of the cooking period.

12. In apparatus for cooking articles such as doughnuts with hot cooking liquor, a circular receptacle for the liquor, rotating means for progressing the articles in the liquor, and means deriving movement from the rotating progressing means for forming and releasing the articles to drop into the liquor, for turning over the articles during cooking, and for ejecting them at the expiration of the cooking period.

13. In apparatus for cooking articles such as doughnuts with hot cooking liquor, a receptacle for the liquor, progressing means with cells for maintaining the articles definitely separated in the liquor, and means carried by the progressing means to transfer the articles between cells during cooking.

14. In apparatus for cooking articles such as doughnuts with hot cooking liquor, a receptacle for the liquor, progressing means with cells for maintaining the articles definitely separated in the liquor, and means carried by and actuated through movement of the progressing means to transfer the articles between cells during cooking.

15. In apparatus for cooking articles such as doughnuts with hot cooking liquor, a receptacle for the liquor, progressing means with cells for maintaining the articles definitely separated in the liquor, and means carried by and actuated through movement of the progressing means to transfer the articles between cells during cooking and to finally eject them from the apparatus at the expiration of the cooking period.

16. In apparatus for cooking articles such as doughnuts with hot cooking liquor, a receptacle for the liquor, progressing means with cells for maintaining the articles definitely separated in the liquor, and means individual to the cells actuated through movement derived from the progressing means to transfer the articles between cells during cooking.

17. In apparatus for cooking articles such as doughnuts with hot cooking liquor, a receptacle for the liquor, progressing means with cells for maintaining the articles definitely separated in the liquor, manipulating means individual to the cells, and stationary means in the path of the progressing means for successively actuating the manipulating means aforesaid to lift the articles from the liquor and turn them over incidentally to transferring them between cells.

18. In apparatus for cooking articles such as doughnuts with hot cooking liquor, a receptacle for the liquor, progressing means with cells for maintaining the articles definitely separated in the liquor, manipulating means individual to the cells, and stationary means in the patch of the progressing means for successively actuating the manipulating means to transfer the articles between cells during cooking and to finally eject them from the apparatus at the expiration of the cooking period.

19. In apparatus for cooking articles such as doughnuts in hot cooking liquor, a receptacle for the liquor, progressing means with cells for maintaining the articles definitely separated in the liquor, and means individual to the cells operated through movement derived from the progressing means to transfer the articles between cells during cooking and to finally eject them from the apparatus at the expiration of the cooking period.

20. In apparatus for cooking articles such as doughnuts in hot cooking liquor, a circular receptacle for the liquor, rotating progressing means with cells for maintaining the articles definitely separated in the liquor, and means carried by and actuated through movement of the progressing means to transfer the articles between cells and to finally eject them from the apparatus.

21. In apparatus for cooking articles such as doughnuts with hot cooking liquor, a circular receptacle for the liquor, rotating progressing means with cells for maintaining the articles definitely separated in the liquor, and means individual to the cells for transferring the articles between cells during cooking and for ejecting them from the apparatus at the expiration of the cooking period.

22. In apparatus for cooking articles such as doughnuts with hot cooking liquor, a circular receptacle for the liquor, a continuously rotating progressing means with cells for maintaining the articles definitely separated in the liquor, and manipulating means in each of the cells operated through movement derived from the progressing means for transferring the articles between cells during cooking and for finally ejecting them from the apparatus at the expiration of the cooking period.

23. In apparatus for cooking articles such as doughnuts with hot cooking liquor, a receptacle for the liquor, progressing means with parallel rows of cells for maintaining the articles definitely separated in the liquor, and means deriving movement from the progressing means for transferring the articles laterally between the cells of adjacent rows during cooking.

24. In apparatus for cooking articles such as doughnuts with hot cooking liquor, a circular receptacle for the liquor, rotating progressing means with a number of concentric annular series of cells for maintaining the articles definitely separated in the cooking liquor, manipulating means deriving movement from the progressing means for laterally transferring the articles between radially aligned cells of adjacent series during cooking.

25. In apparatus for cooking articles such as doughnuts with hot cooking liquor, a circular receptacle for the liquor, rotating progressing means with an inner and outer annular series of cells for maintaining the articles definitely separated in the cooking liquor, manipulating means deriving movement from the progressing means for transferring the articles individually from the cells of the inner series to corresponding radially aligned cells of the outer series and for ejecting the articles from the cells of the outer series at the expiration of the cooking period.

26. In apparatus for cooking articles such as doughnuts in hot cooking liquor, a circular receptacle for the liquor, rotating progressing means with an inner and outer annular series of cells for maintaining the articles definitely separated in the liquor, manipulating means individual to the inner cells for transferring the articles to corresponding cells of the outer series during cooking, and means individual to the outer cells for ejecting the articles from the apparatus at the expiration of the cooking period.

27. In apparatus for cooking articles such as doughnuts with hot cooking liquor, a circular receptacle for the liquor, rotating progressing means with an inner and outer annular series of cells for maintaining the articles definitely separated in the liquor, manipulating means individual to the cells of the inner series to transfer the articles to corresponding cells of the outer series during cooking, and manipulating means individual to the cells of said outer series for ejecting the articles from the apparatus at the expiration of the cooking period, and stationary cams in the path of movement of the progressing means for actuating the several manipulating means in the manner described.

28. In apparatus for cooking articles such as doughnuts in hot cooking liquor, a receptacle for the liquor, progressing means with cells for maintaining the articles definitely separated in the cooking liquor, normally submerged manipulating means individual to the cells adapted to transfer the articles from one cell to another during cooking and to eject the articles from the apparatus at the expiration of the cooking period, each such manipulating means including a member vertically slidable in a bearing afforded by the progressing means and a hand pivoted to said member, a stationary cam overtravelled by the progressing means for successively lifting the manipulating means, and means whereby the hand aforesaid is automatically swung on its pivot incidentally to the rise of the manipulating means to row the article over the barrier separating the cell from a contiguous cell or over the side wall of the receptacle.

29. In apparatus for cooking articles such as doughnuts with hot cooking liquor, a receptacle for the liquor, continuously moving means for progressing the articles in the liquor, and means operated by the continuously moving progressing means for successively forming and releasing raw articles to drop into the liquor.

30. In apparatus for cooking articles such as doughnuts with hot cooking liquor, a circular receptacle for the liquor, a continuously rotating means for progressing the articles about in the liquor, and forming means for successively releasing raw articles to drop into the liquor, said forming means being operated by the continuously rotating progressing means.

31. In apparatus for cooking articles such as doughnuts with hot cooking liquor, a receptacle for the liquor, continuously moving progressing means with cells for maintaining the articles definitely separated in the cooking liquor, and means operated by the continuously moving progressing means for forming and releasing individual raw articles to drop into the liquor upon successive presentation of the cells to receive them.

32. In apparatus for cooking articles such as doughnuts with hot cooking liquor, a circular receptacle for the liquor, a continuous-rotating progressing means with cells for maintaining the articles definitely separated in the cooking liquor, and means operated by the continuously rotating progressing means for forming and releasing individual raw articles to drop upon successive presentation of the cells to receive them.

33. In apparatus for cooking articles such as doughnuts with hot cooking liquor, a circular receptacle for the liquor, a continuously rotating progressing means with cells for maintaining the articles definitely separated in the cooking liquor, means to form the raw articles, and cam means afforded by the continuously-rotating progressing means for actuating the forming means to release individual raw articles upon successive presentation of the cells to receive them.

34. In apparatus for cooking articles such as doughnuts with hot cooking liquor, a circular receptacle for the liquor, continuously rotating progressing means with cells for maintaining the articles definitely separated in the cooking liquor, means to form the raw articles, a concentric scallop-edged cam on the progressing means, and a rocker arm coordinated with the forming device and riding the scallop-edged cam aforesaid to actuate the forming device for releasing individual raw articles to drop into the liquor upon successive presentation of the cells to receive them.

In testimony whereof, I have hereunto signed my name at Philadelphia, Pennsylvania, this 14th day of June, 1928.

JOHN C. BERGNER.